United States Patent
Barbieri et al.

(10) Patent No.: US 9,949,248 B2
(45) Date of Patent: Apr. 17, 2018

(54) RESTRICTIONS ON CONTROL CHANNEL SCHEDULING

(71) Applicant: QUALCOMM Incorporated, San Diego, CA (US)

(72) Inventors: Alan Barbieri, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/448,157

(22) Filed: Jul. 31, 2014

(65) Prior Publication Data

US 2015/0055586 A1    Feb. 26, 2015

Related U.S. Application Data

(60) Provisional application No. 61/867,943, filed on Aug. 20, 2013.

(51) Int. Cl.
  *H04W 72/04*    (2009.01)
  *H04L 1/00*    (2006.01)

(52) U.S. Cl.
  CPC ......... *H04W 72/042* (2013.01); *H04L 1/0052* (2013.01)

(58) Field of Classification Search
  CPC .... H04W 72/042; H04W 72/04; H04L 1/0052
  USPC ....................................................... 370/329
  See application file for complete search history.

(56) References Cited

U.S. PATENT DOCUMENTS

| | | | |
|---|---|---|---|
| 2011/0076962 A1* | 3/2011 | Chen | H04L 5/001 455/68 |
| 2011/0103509 A1* | 5/2011 | Chen | H04L 5/0007 375/295 |
| 2012/0082130 A1* | 4/2012 | Xue | H04L 5/001 370/330 |
| 2013/0005269 A1* | 1/2013 | Lindoff | H04J 11/0026 455/63.1 |

(Continued)

OTHER PUBLICATIONS

Fujitsu: "EPDCCH search space function", 3GPP Draft; R1-124736 EPDCCH Search Space Final, 3rd Generation Partnership Project (3GPP), Mobile Competence Centre ; 650, Route Des Lucioles ; F-06921 Sophia-Antipolis Cedex ; France, vol. RAN WG1, No. New Orleans, USA; Nov. 2, 2012, XP050662600, pp. 1-3, [retrieved on Nov. 2, 2012].

(Continued)

*Primary Examiner* — Noel Beharry
*Assistant Examiner* — Ruihua Zhang
(74) *Attorney, Agent, or Firm* — Nerrie M. Zohn

(57) ABSTRACT

Methods and apparatus are disclosed for improving blind-decoding and interference suppression associated with interference from non-serving cells in a wireless network, specifically, performing interference suppression on the non-serving cell control channel. Various aspect employ network-assisted blind-decoding of non-serving cell signals at UEs through the coordination, communication, and use of communication restriction conditions. Network aspects may restrict certain communications between eNBs and served UEs, and communicate the restrictions to non-served UE. The non-served UEs can then leverage the restrictions for more efficient blind-decoding of interfering eNB signals and interference cancellation of interfering eNB signals.

24 Claims, 13 Drawing Sheets

(56) References Cited

U.S. PATENT DOCUMENTS

| | | | | |
|---|---|---|---|---|
| 2013/0136095 A1* | 5/2013 | Nishio | ............... | H04L 5/0007 370/329 |
| 2013/0223400 A1* | 8/2013 | Seo | ............... | H04J 11/005 370/329 |
| 2013/0324117 A1* | 12/2013 | Kim | ............... | H04L 1/0047 455/434 |
| 2014/0003356 A1* | 1/2014 | Wang | ............... | H04W 72/1289 370/329 |
| 2014/0094216 A1* | 4/2014 | Park | ............... | H04W 24/08 455/522 |
| 2014/0153452 A1* | 6/2014 | Son | ............... | H04L 5/001 370/280 |
| 2014/0269597 A1* | 9/2014 | Park | ............... | H04J 11/005 370/329 |
| 2016/0135194 A1* | 5/2016 | Kim | ............... | H04B 7/0626 370/329 |

OTHER PUBLICATIONS

Intel Corporation: "Discussion on network assistance information for enhanced IS/IC receivers", 3GPP Draft; R4-133543—NAICS—Network Assistance Information, 3rd Generation Partnership Project (3GPP), Mobilecompetence Centre ; 650, Route Des Lucioles ; F-06921 Sophia-Antipolis Cedex; France vol. RAN WG4, No. Barcelona, Spain; Aug. 2013 (Aug. 13, 2013), XP050721729, pp. 1-5 [retrieved on Aug. 13, 2013].

International Search Report and Written Opinion—PCT/US2014/049583—ISA/EPO—Nov. 28, 2014. (13 total pages).

LG Electronics: "Blind Decoding Reduction Methods", 3GPP Draft; R1-102709 BD LGE, 3rd Generation Partnership Project (3GPP), Mobile Competence Centre ; 650, Route Des Lucioles ; F-06921 Sophia-Antipolis Cedex; France, vol. RAN WG1, No. Montreal, Canada; 20100510, May 4, 2010, XP050419912, pp. 1-3 [retrieved on May 4, 2010].

Alcatel-Lucent et al., "On Macro-assisted Interference Suppression/Cancellation", 3GPP Draft, R1-132036—Rel-12 UMTS HETNET—On Macro-assisted Interference Cancellation V0.2, $3^{rd}$ Generation Partnership Project (3GPP), Mobile Competence Centre, 650, Route Des Lucioles, F-06921, RAN WG1, Fukuoka, Japan, 20130520-20130524, May 11, 2013 (May 11, 2013), pp. 1-3, XP050697819, Retrieved from the Internet: URL: http://www.3gpp.org/ftp/tsg_ran/WG1_RL1/TSGR1_73/Docs/ [retrieved on May 11, 2013].

* cited by examiner

RESTRICTIONS ON CONTROL CHANNEL SCHEDULING

CLAIM OF PRIORITY

The present application for patent claims priority to Provisional Application No. 61/867,943 entitled "APPARATUSES AND METHODS OF RESTRICTIONS ON PDCCH SCHEDULING TO ENABLE PDCCH DECODING OF NEIGHBOR CELLS" filed Aug. 20, 2013, which is assigned to the assignee hereof and hereby expressly incorporated by reference herein.

BACKGROUND

The present disclosure relates generally to communication systems, and more particularly, to restrictions on control channel scheduling for improving the decoding of neighboring cells.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some wireless communication networks, inefficient and/or ineffective utilization or overutilization of available communication resources, particularly for control channel decoding, may lead to degradations in wireless communication. Even more, the foregoing inefficient resource utilization or overutilization inhibits user equipments and/or wireless devices from achieving higher wireless communication quality. Thus, improvements in control channel decoding are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and apparatus are disclosed for improving blind-decoding and interference suppression associated with interference from non-serving cells in a wireless network, specifically, performing interference suppression on the non-serving cell control channel. Various aspect employ network-assisted blind-decoding of non-serving cell signals at UEs through the coordination, communication, and use of communication restriction conditions. Network aspects may restrict certain communications between eNBs and served UEs, and communicate the restrictions to non-served UE. The non-served UEs can then leverage the restrictions for more efficient blind-decoding of interfering eNB signals and interference cancellation of interfering eNB signals.

In an aspect, a method of decoding a control channel in a communication system includes determining a control channel restriction condition. The method further includes identifying at least one subframe, in a received signal, conforming to the control channel restriction condition. Additionally, the method includes decoding a control channel associated with a network entity in the at least one subframe based on the control channel restriction condition, wherein the control channel associated with the network entity conforms to the control channel restriction condition.

In another aspect, an apparatus for decoding a control channel includes a decoding component configured to determine a control channel restriction condition. The apparatus further includes an identification component configured to identify at least one subframe, in a received signal, conforming to the control channel restriction condition. Additionally, the decoding component is further configured to decode a control channel associated with a network entity in the at least one subframe based on the control channel restriction condition, wherein the control channel associated with the network entity conforms to the control channel restriction condition.

In an additional aspect, a method of restricting a control channel transmission at a network entity includes applying generating a control channel transmission for at least one subframe in accordance with a control channel restriction condition, wherein the control channel restriction condition restricts an arrangement of the control channel transmission in the at least one subframe. The method further includes transmitting the control channel transmission.

In a further aspect, an apparatus for restricting a control channel transmission includes a control channel restriction component configured to generate a control channel transmission for at least one subframe in accordance with a control channel restriction condition, wherein the control channel restriction condition restricts an arrangement of the control channel transmission in the at least one subframe. The control channel restriction component is further configured to transmit the control channel transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
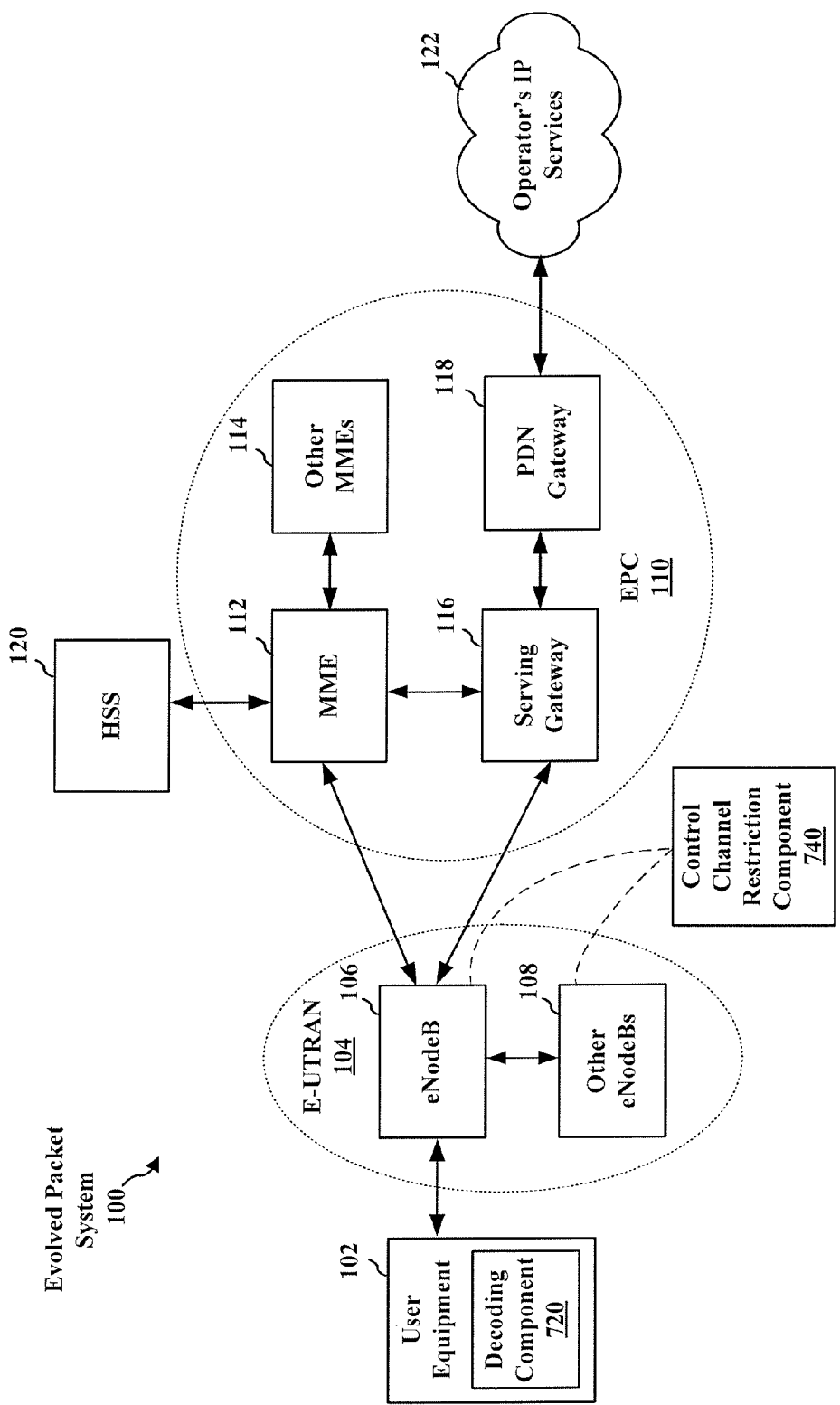
FIG. 1 is a diagram illustrating an example of a network architecture in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present aspects generally relate to restrictions on control channel scheduling by a network entity (e.g., eNB) and decoding by a user equipment (UE). Specifically, in some wireless communication systems, a UE may be unaware of its control channel and as a result, may decode a large portion or number of control channels. In some aspects, for example, the control channel may be a Physical Downlink Control Channel (PDCCH). Specifically, for instance, the UE may be informed of a number of regions within the control region of a subframe and may not be provided with the location of its corresponding PDCCH. The UE may locate its PDCCH by monitoring a set of PDCCH candidates in every subframe. Such decoding may be referred to as blind decoding.

However, blind decoding of PDCCHs may be inefficient as radio network temporary identifiers may be unknown to the UE. Additionally, decoding a large portion (e.g., nearly all control channel elements (CCEs)) to locate a UE specific PDCCH may result in degradations in wireless communication quality. For instance, for large system bandwidths, with a large number of possible PDCCH locations, blind searching may be a significant burden, leading to excessive power consumption at the UE. Further, the foregoing blind decoding may result in an increase in a false alarm probability and a misdetection probability.

In an aspect, the false alarm probability may be the conditional total probability of erroneous detection of the preamble of a data packet (e.g., erroneous detection from any detector) when the input is only noise. In another aspect, misdetection probability may be the probability that a secondary wireless system determines that a primary signal is not present on a given channel when, in fact, the primary system does occupy that channel. Accordingly, an increase in either the false alarm probability or the misdetection probability may lead to degradations in wireless communication quality at both the UE and the network entity.

As such, the present aspects may improve blind decoding and interference suppression associated with interference from cells in a wireless communication network, specifically, performing interference suppression on the cell Physical Downlink Shared Channel (PDSCH). Aspects of the present disclosure relate to network-assisted blind decoding of cell signals (e.g., PDCCH) at UEs through the coordination, communication, and use of communication restriction conditions. Network aspects may restrict certain communications between eNBs and served UEs and communicate the restrictions to non-served UE. The non-served UEs can then leverage the restrictions for more efficient blind decoding of interfering eNB signals and interference suppression (e.g., interference cancellation) of interfering eNB signals.

FIG. 1 is a diagram illustrating an LTE network architecture. The LTE network architecture may be referred to as an Evolved Packet System (EPS) 100. The EPS 100 may include one or more user equipment (UE) 102, which may include decoding component 720 as described herein, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 104 includes the evolved Node B (eNB) 106 and other eNBs 108, one or both of which may include control channel restriction component 740, as described herein. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
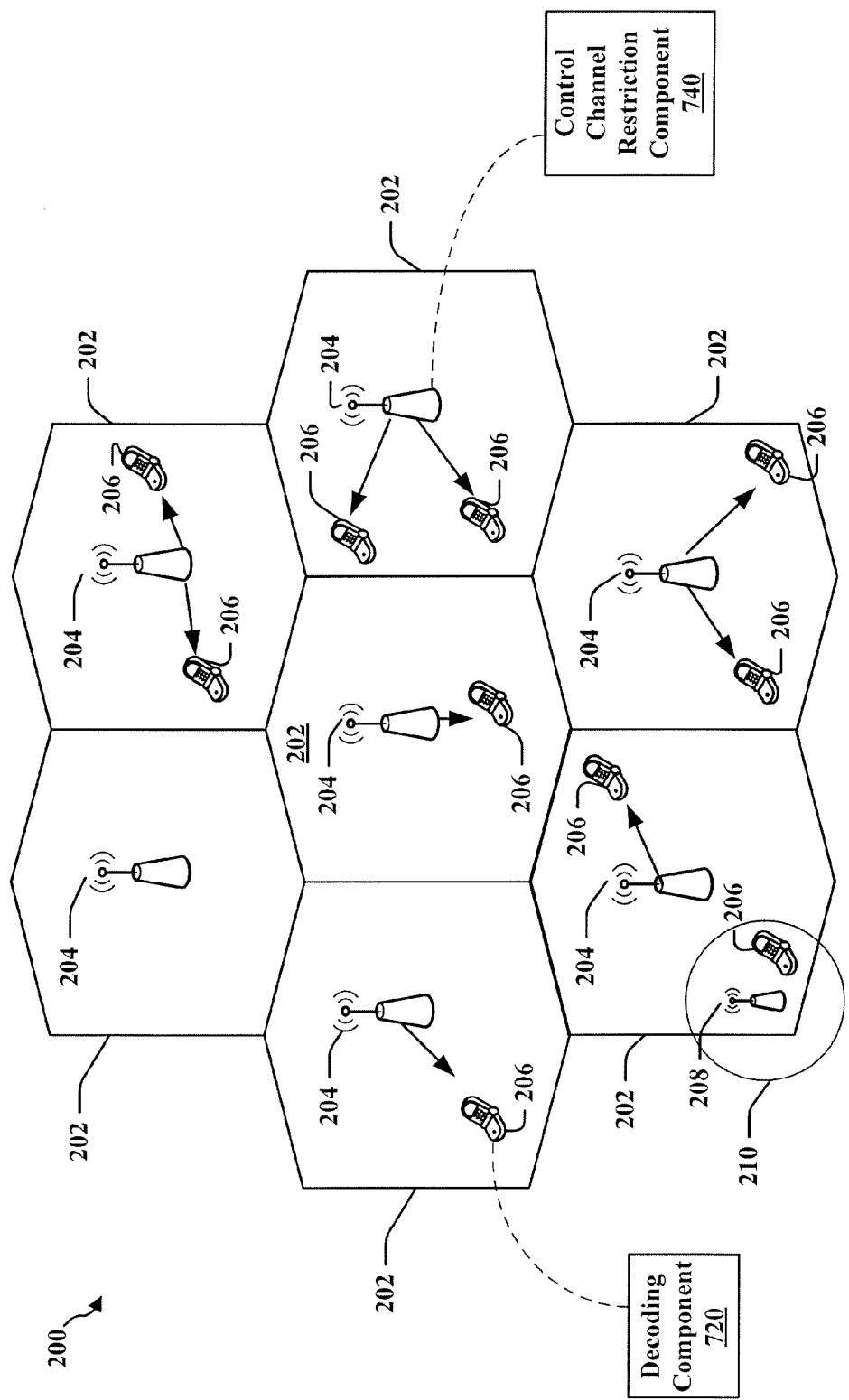
FIG. 2 is a diagram illustrating an example of an access network in accordance with an aspect of the present disclosure.

FIG. 2 is a diagram illustrating an example of an access network 200 in an LTE network architecture in which one or more UEs 206 may each include decoding component 720 and each of the eNBs 208 may include control channel restriction component 740, both of which are described herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of amplitude and phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially preceding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
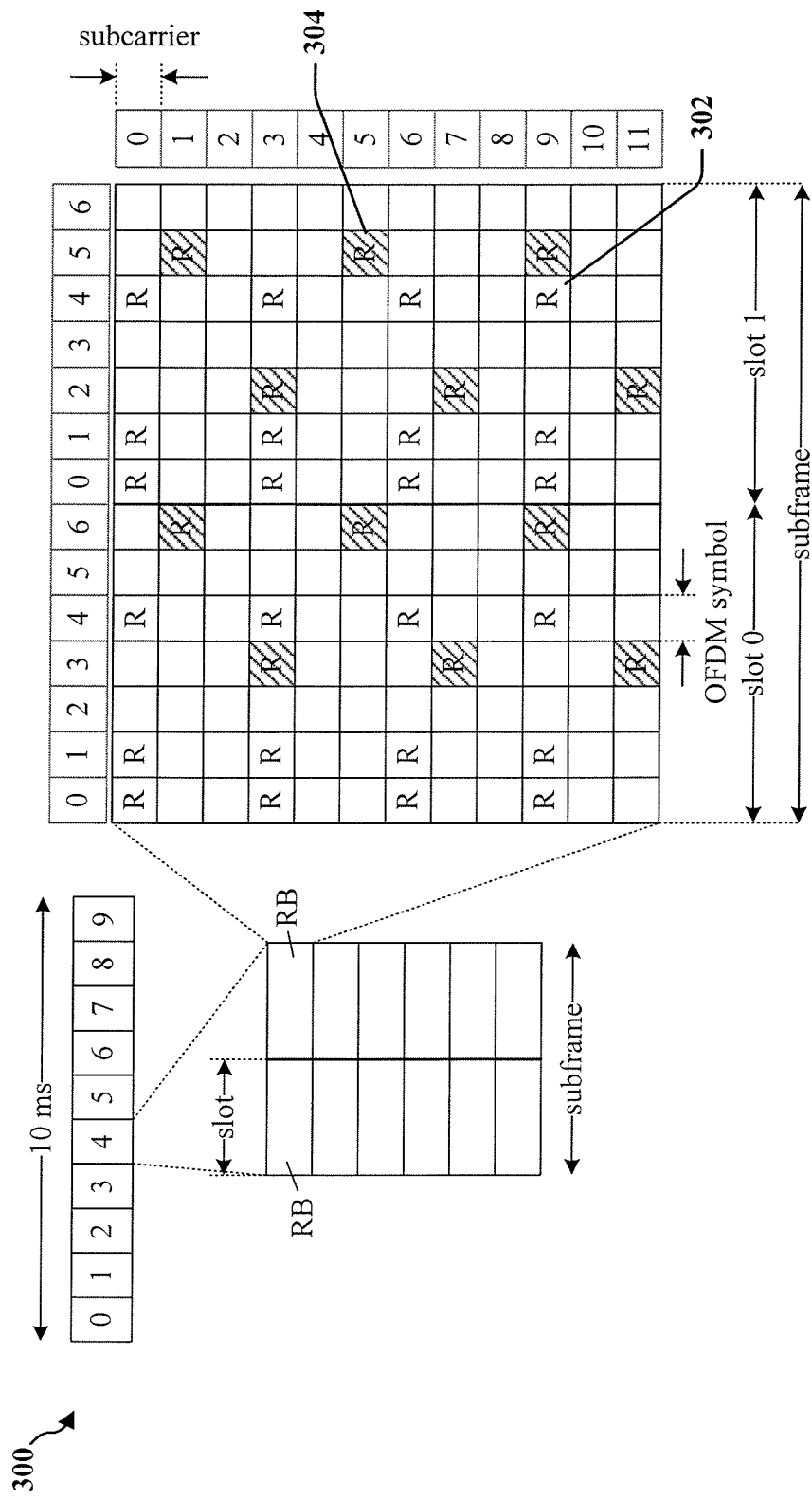
FIG. 3 is a diagram illustrating an example of a DL frame structure in LTE in accordance with an aspect of the present disclosure.

FIG. 3 is a diagram 300 illustrating an example of a DL frame structure in LTE, which may be utilized by a UE such as UE 702 including decoding component 720 and a network entity (e.g., eNB), such as first network entity 704 and/or second network entity 706, one or both of which may include control channel restriction component 740, and as described herein. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain, resulting in a total of 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
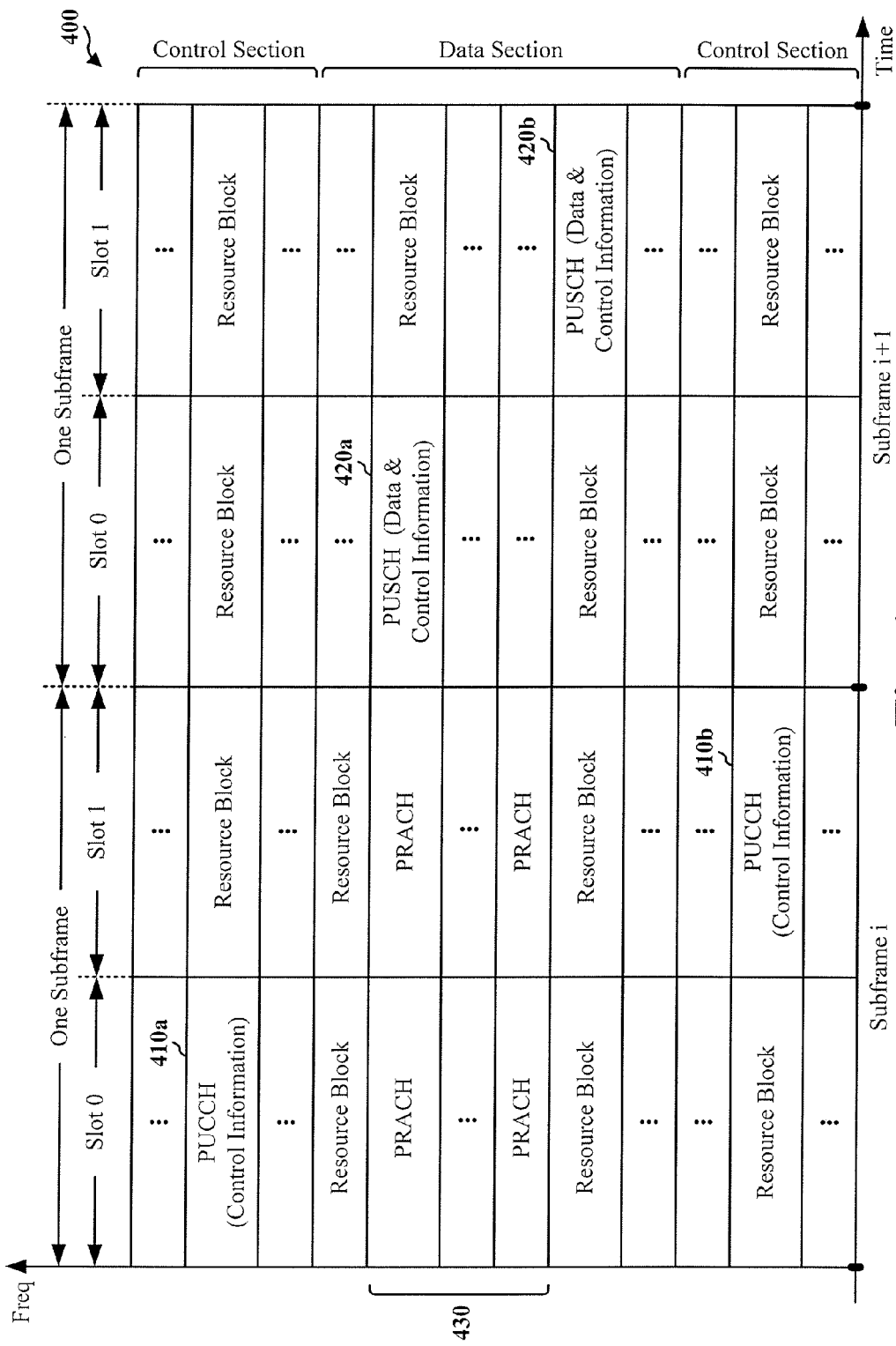
FIG. 4 is a diagram illustrating an example of an UL frame structure in LTE in accordance with an aspect of the present disclosure.

FIG. 4 is a diagram 400 illustrating an example of an UL frame structure in LTE, which may be utilized by a UE such as UE 702 including decoding component 720 and a network entity (e.g., eNB), such as first network entity 704 and/or second network entity 706, one or both of which may include control channel restriction component 740, and as described herein. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
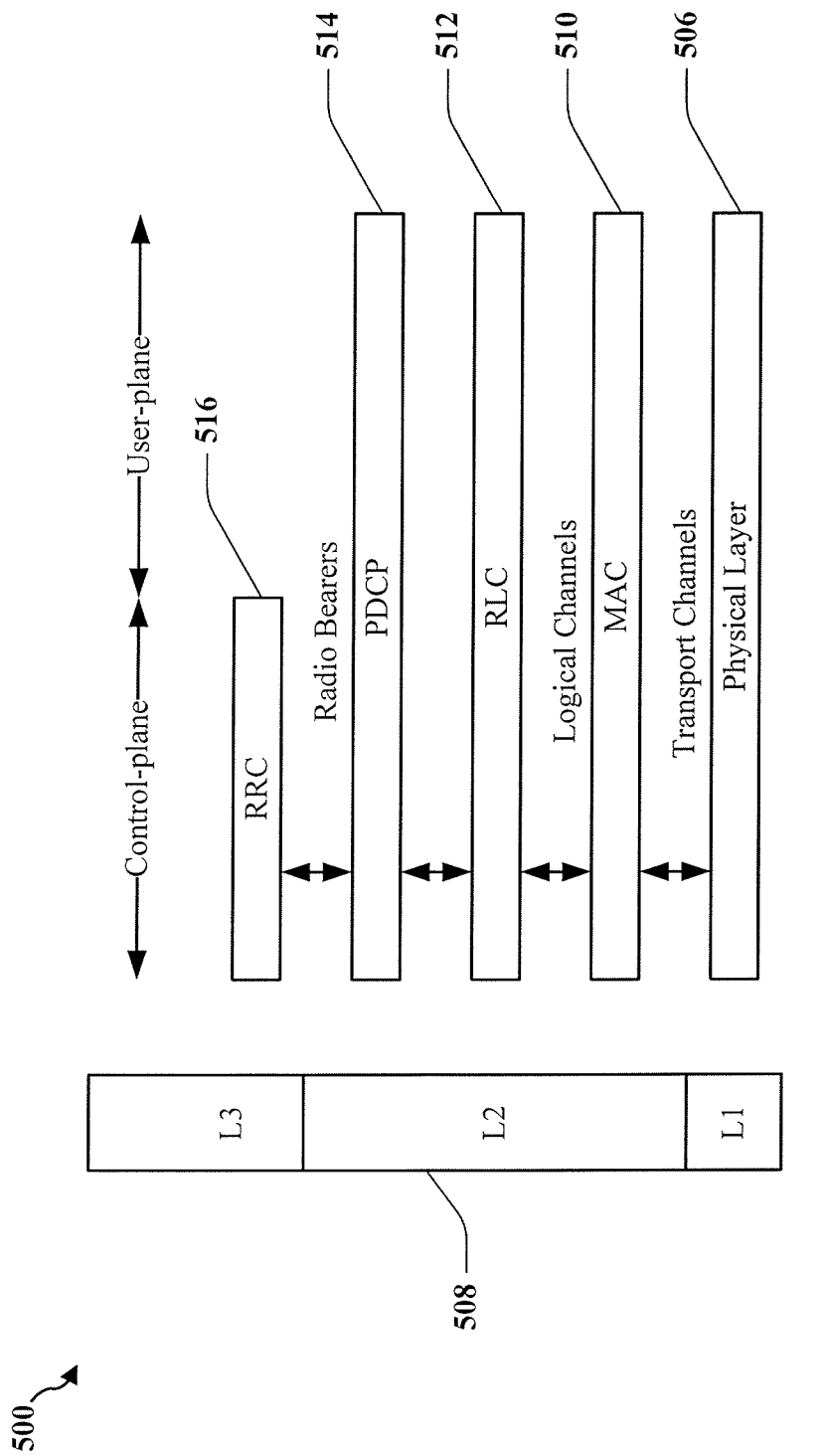
FIG. 5 is a diagram illustrating an example of a radio protocol architecture for the user and control planes in accordance with an aspect of the present disclosure.

FIG. 5 is a diagram 500 illustrating an example of a radio protocol architecture for the user and control planes in LTE. The radio protocol architecture may be may be utilized by a UE such as UE 702 including decoding component 720 and a network entity (e.g., eNB), such as first network entity 704 and/or second network entity 706, one or both of which may include control channel restriction component 740, and as described herein. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
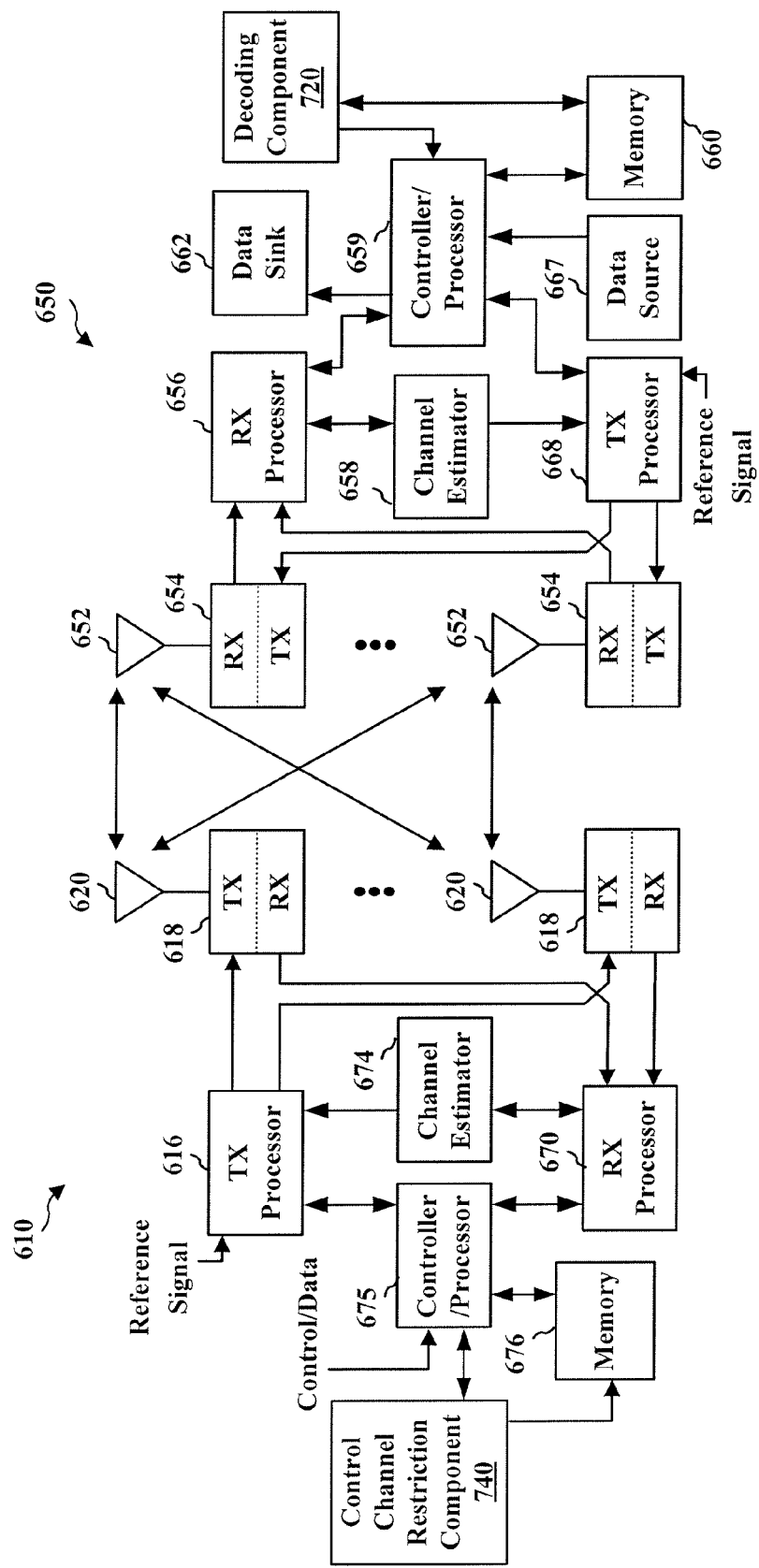
FIG. 6 is a diagram illustrating an example of an evolved Node B and user equipment in an access network in accordance with an aspect of the present disclosure.

FIG. 6 is a block diagram of an eNB 610 in communication with a UE 650 in an access network. The eNB 610 may include control channel restriction component 740, as described herein. Additionally, UE 650 may include decoding component 720, as described herein. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
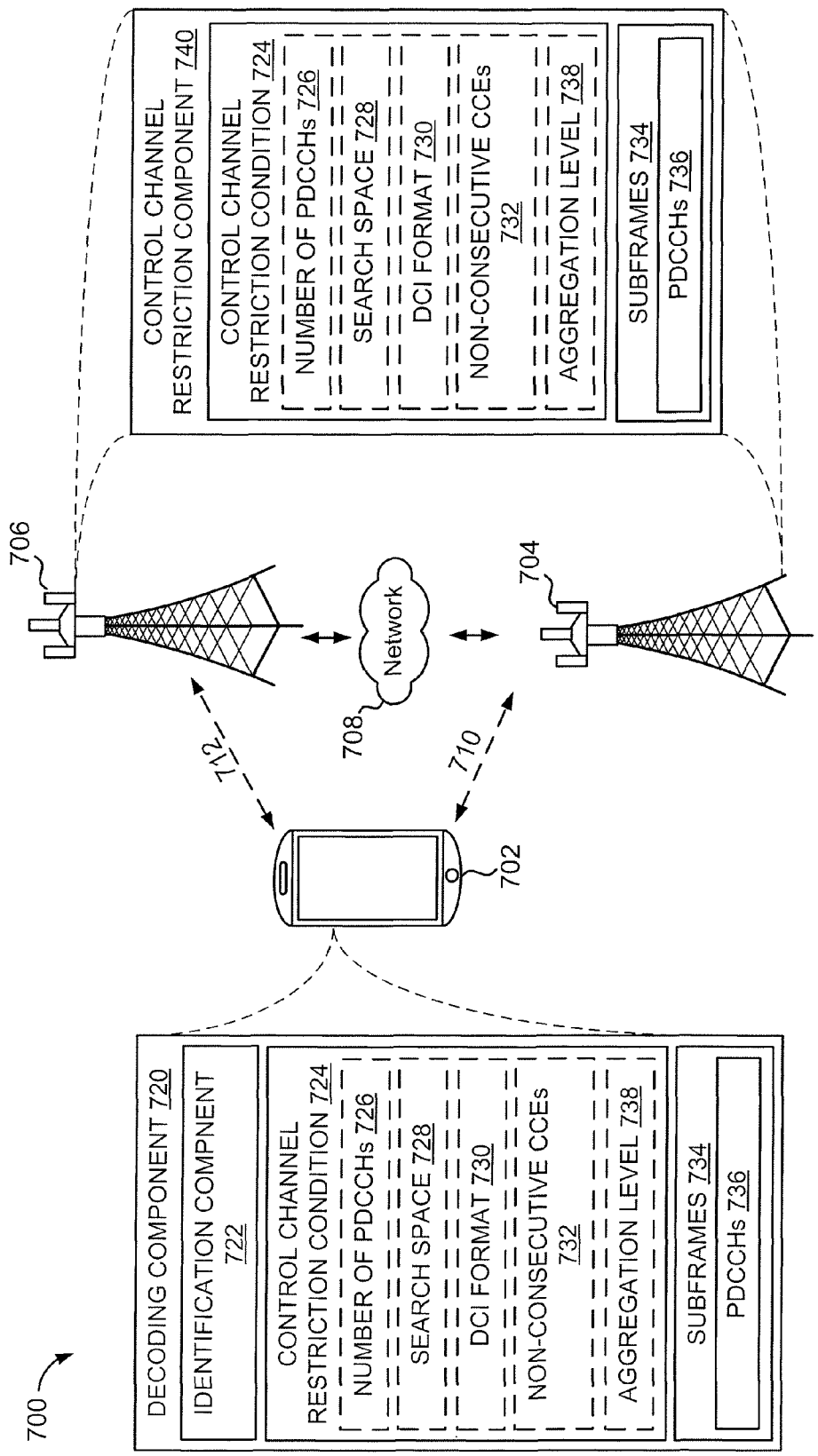
FIG. 7 is a schematic diagram of a wireless communication system including an aspect of a control channel restriction component at a network entity and a decoding component at a user equipment.

Referring to FIG. 7, in an aspect, a wireless communication system 700 includes at least one UE 702 in communication coverage of at least a first network entity 704 and a second network entity 706. UE 702 may communicate with network 708 via one or both of first network entity 704 and second network entity 706. In other aspects, multiple UEs including UE 702 may be in communication coverage with one or more network entities, including first network entity 704 and second network entity 706.

For instance, UE 702 may communicate with first network entity 704 on or using one or more communication channels 710. Further, for example, UE 702 may communicate with second network entity 706 on or using one or more communication channels 712. In such aspects, communication channels 710 and 712 may utilize or facilitate communication based on one or more technology types (e.g., LTE). Additionally, one or more communication channels 710 and/or 712 may communicate on the uplink and downlink according to the communication aspects described herein with respect to FIGS. 3-5.

It should be understood that UE 702 may communicate with one or more cells included or deployed at one or both first network entity 704 and second network entity 706. That is, UE 702 may select or reselect from one cell at first network entity 704 to another cell at first network entity 704. In other aspects, first network entity 704 may alternatively be referred to as a first cell with which UE 702 maintains a radio resource control (RRC) connected state. Additionally, UE 702 may transmit and/or receive wireless communication to and/or from first network entity 704 and/or second network entity 706. For example, such wireless information may include, but is not limited to, PDCCH transmissions.

In some aspects, UE 702 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, a device for Internet-of-Things, or some other suitable terminology.

Additionally, first network entity 704 and second network entity 706 may be a macrocell, small cell, picocell, femtocell, access point, relay, Node B, mobile Node B, UE (e.g., communicating in peer-to-peer or ad-hoc mode with UE 702), or substantially any type of component that can communicate with UE 702 to provide wireless network access at the UE 702.

According to the present aspects, UE 702 may include decoding component 720, which may include various components and/or subcomponents configured to decode a control channel transmitted or broadcasted by one or both of first network entity 704 and second network entity 706. Specifically, UE 702 may be configured to efficiently decode the received subframes 734 in order to decode its control channel (e.g., PDCCHs 736). For instance, the PDCCH may be a downlink control channel used to support data transmissions in LTE. In addition, the PDCCH may carry scheduling assignments and other control information. The one or more communication channels 710 and/or 712 may include or communicate on the PDCCH.

In an aspect, decoding component 720 may be configured to receive control channel restriction condition 724 from one or both of first network entity 704 and second network entity 706. As such, decoding component 720 may be configured to determine control channel restriction condition 724, thereby reducing the searching required in a blind decoding procedure, and allowing UE to more efficiently blind decode. In other words, decoding component 720 may be configured to determine one or more control channel restrictions included or forming within the control channel restriction condition 724 for restricting the decoding of the control channel (e.g., PDCCHs 736) in one or more subframes 734. In some aspects, control channel restriction condition 724 may include a number of different types of control channel restrictions, such as, but not limited to, a restriction on a number of PDCCHs 726, a search space 728, a DCI format and/or a non-consecutive CCEs 732.

For example, decoding component 720 can be configured to determine control channel restriction condition 724 after receiving a transmission including the control channel restriction condition 724, from one or both of first network entity 704 and second network entity 706. Further, decoding component 720 may include identification component 722, which may be configured to identify at least one subframe (e.g., in the received subframes 734) conforming to the control channel restriction condition 724. Indeed, in some aspects, UE 702 may be configured to receive and identify a control channel restriction type and a subframe mask forming the control channel restriction condition 724 from one or both of first network entity 704 and second network entity 706.

In another aspect, decoding component 720 may be configured to blind decode a control channel (e.g., PDCCHs 736) in at least one subframe (e.g., subframes 734) associated with a network entity based on the control channel restriction condition 724. In some aspects, the network entity may be a serving or non-serving network entity. Further, the control channel associated with the non-serving network entity may conform to the control channel restriction condition 724. For example, after receiving one or more subframes 734 from second network entity 706 over the one or more communication channels 712, decoding component 720 may be configured to decode one or more PDCCHs 736 included within the one or more subframes 734 based on the control channel restriction condition 724.

For example, in an aspect, the first network entity 704 may be the serving network entity and the second network entity 706 may be the non-serving network entity. Further, as UE 702 has received subframe type information associated with the control channel restriction condition 724 from one or both of first network entity 704 and second network entity 706, UE 702 may recognize or identify which subframes 734 the control channel restriction condition 724 has been applied. Therefore, UE 702 may perform further decoding and processing only on the subframes 734 which have been identified by the control channel restriction condition 724 as subframes for further processing and decoding (e.g., as including UEs 702 PDCCHs).

The control channel restriction condition 724 may be determined or otherwise formed by a network entity. For example, one or both of first network entity 704 and second network entity 706 may include control channel restriction component 740, which may be configured to restrict a control channel scheduling and subsequent transmission (e.g., transmission of PDCCHs 736) to UE 702.

Control channel restriction component 740 may be configured to apply or otherwise set a control channel restriction condition 724 to at least one subframe (e.g., in the one or more subframes 734) including a control channel transmission (e.g., one or more PDCCHs 736). As such, the control channel restriction condition 724 may restrict an arrangement or scheduling of the control channel transmission (e.g., transmission of one or more PDCCHs 736) in the one or more subframes 734 to UE 702.

In an aspect, control channel restriction component 740 may be configured to restrict a number of PDCCHs 726 in one or more subframes 734. For example, to apply the control channel restriction condition 724 to one or more subframes 734, control channel restriction component 740 may be configured to restrict a number of control channel transmissions (e.g., PDCCHs 736) in at least one subframe of the one or more subframes 734. Such a restriction may apply to all subframes of subframes 734 or selected subset of subframes 734.

In another aspect, control channel restriction component 740 may be configured to restrict a number of downlink grants of at least one downlink control information (DCI) format 730 in the control channel transmission. In such aspect, a PDCCH may carry a message known as DCI, which includes transmission resource assignments and other control information for UE 702 or group of UEs including UE 702. As such, the control channel restriction condition 724 may include a restriction on a number of downlink grants of at least one DCI format 730. For instance, to apply the control channel restriction condition 724 to one or more subframes 734, control channel restriction component 740 may be configured to restrict a number of downlink grants of one or more DCI formats 730 in the control channel transmission (e.g., transmission of one or more PDCCHs 736 in the one or more subframes 734).

Additionally, control channel restriction component 740 may be configured to restrict an aggregation level 738 associated with the control channel transmission. As such, control channel restriction condition 724 may include a restriction of an aggregation level 738 associated with the control channel (e.g., one or more PDCCH 736). Specifically, to apply the control channel restriction condition 724 to one or more subframes 734, control channel restriction component 740 may be configured to restrict an aggregation level 738 associated with the control channel transmission (e.g., one or more PDCCHs 736).

In some aspects, the aggregation level 738 may indicate a number of control channel elements (CCEs) in the control channel transmission. In particular, the number of CCEs in a PDCCH transmission may depend upon the aggregation level, which can be 1, 2, 4 and 8 depending upon number of bits to be transmitted. For instance, a physical control channel (e.g., PDCCHs 736) may be transmitted on an aggregation of one or more CCEs, where a CCE may correspond to 9 resource element groups (REG). Each REG in turn may have 4 Resource Elements (REs).

In a non-liming aspect, when the control channel restriction condition 724 includes a restriction on a DCI format 730 and/or a restriction on a aggregation level 738, control channel restriction component 740 may be configured to restrict subframes 734 based on the downlink grants of a certain DCI format with a predefined aggregation level (e.g., the number of CCEs that are allocated at a time). Indeed, knowing the aggregation level in combination with Radio Network Temporary Identities (RNTI) identifies the possible DCIs start locations. The higher the aggregation level, the fewer PDCCHs can be transmitted in the control region of a given subframe. Note that different PDCCHs transmitted in the same subframe by the same cell can use different aggregation levels.

For example, generally DCI format 2, 2A, 2B, and 2C may be used to schedule UEs configured in TM 4, 3, 8, and 9 respectively. However, in order simplify the operation of UE 702, the DCI format 730 and aggregation level 738 restriction conditions serve only UEs configured in a certain TM, e.g., TM 4. Therefore, only DCI format 2 may be utilized, thus reducing the number of blind decodes at UE 702. Again, this restriction may apply to all subframes of subframes 734 or selected subset of subframes 734.

In a further aspect, control channel restriction component 740 may be configured to restrict a search space 728 associated with the control channel transmission. As such, control channel restriction condition 724 may include a restriction on a search space 728 associated with the control channel (e.g., one or more PDCCHs). Specifically, to apply the control channel restriction condition 724 to one or more subframes 734, control channel restriction component 740 may be configured to restrict a size or region of a search space 728 associated with the control channel (e.g., one or more PDCCHs).

The search space 728 may indicate a set of CCE locations used for locating the control channel. For example, the set of CCE locations in which the UE 702 may find one or more of its PDCCHs 736 may be considered as search space 728. In such aspect, the search space 728 may be a different size for each PDCCH format. Moreover, separate dedicated and common search spaces may be defined, where a dedicated search space may be configured for each UE individually, while all UEs are informed of the extent of the common search space.

In a non-limiting aspect, when the control channel restriction condition 724 includes a restriction on a search space 728, the one or both of first network entity 704 and second network entity 706 may guarantee that downlink grants are transmitted only on a predefined subset of CCEs. That subset may become the new search space for UE 702 attempting to decode the neighboring cells PDCCHs 736. Again, this restriction may apply to all subframes of subframes 734 or selected subset of subframes 734.

In some aspects, control channel restriction component 740 may be configured to restrict the search space 728 for each RNTI based on an aggregation level 738. The RNTI may be used to identify UEs such as UE 702 within a communication network such as wireless communication system 700, in particular in signaling messages between UE 702 and network 708 via one or both of first network entity 704 and second network entity 706.

For instance, a network entity may have a set of active UEs (i.e., UEs with pending downlink data), where each active UE is associated with an RNTI. Therefore, for each RNTI and depending on the aggregation level, several candidate locations may be chosen. As such, 16 potential PDCCH transmissions among the active RNTIs may be determined (e.g., RNTI times the number of aggregation level times the number of candidates plus the aggregation level). The node may choose among these 16 PDCCH transmissions that fall with a pre-assigned/signaled restricted search space.

Further, to restrict the search space 728, control channel restriction component 740 may be configured to coordinate with at least one neighboring network entity to restrict the search space 728 to a set of non-overlapping CCE locations. For example, in such an aspect, first network entity 704 may be the serving network entity and second network entity may be a neighboring network entity. As such, first network entity 704 may coordinate with second network entity 706 to schedule or arrange a search space 728 such that CCE locations including the one or more PDCCHs do not overlap with CCE locations of the second network entity 706 including its PDCCHs.

It should be noted that communication and coordination between network entities (e.g., eNBs) of the control channel restriction condition 724 may be performed via backhaul communications (e.g., over X2) or over wired or wireless communications (e.g., with relays and femto cells), thereby performing interference suppression on the non-serving network entity PDCCH. For example, the interference suppression may include codeword-level interference cancellation.

It should be noted that additional PDCCHs may be transmitted anywhere when UE 702 is interested in further processing of the downlink grants. In other words, since UE 702 may be interested in decoding downlink grants, other types of information (e.g., UL grants, power control commands, etc.) may still be transmitted outside the set of CCEs.

In an additional aspect, to avoid UE 702 having to decode the one or more PDCCHs 736 at higher aggregation levels, control channel restriction component 740 may be configured to restrict a scheduling of the control channel transmission (e.g., one or more PDCCHs 736) to non-consecutive CCEs 732 in the one or more subframes 734. In other words, control channel restriction condition 724 may include a restriction on a scheduling of the one or more PDCCHs 736 to non-consecutive CCEs 732 in at least one subframe 734. Specifically, to apply the control channel restriction condition 724 to one or more subframes 734, control channel restriction component 740 may be configured to restrict a scheduling of the control channel transmission (e.g., one or more PDCCHs 736) to non-consecutive CCEs 732 in the one or more subframes 734.

Further, when the control channel restriction condition 724 includes a restriction on non-consecutive CCEs 732, a network entity (e.g., first network entity 704 and/or second network entity 706) may schedule RNTI candidates that ensure that the corresponding PDCCHs 736 have empty CCEs between them. For example, assuming two PDCCHs 736 are transmitted in CCE [x, x+1, . . . , x+N−1] and [y, y+1, . . . , y+M−1], with aggregation levels N=M=4 or 2 or 1. If y=x+N, i.e., they are consecutive in the CCE space, UE 702 may attempt to decode all CCEs together as a single, higher aggregation level PDCCH, thus potentially incurring a higher misdetection and/or false alarm rate.

For example, when a base station uses aggregation level 2, the CCEs are allocated in sets of two. If two PDCCHs 736 are allocated one after the other, four consecutive CCEs will be allocated. However, this makes it hard for the UE to determine if the Node is sending two PDCCHs 736 with aggregation level 2, or one with aggregation level 4. Since either way it would use 4 consecutive CCEs.

However, when the control channel restriction condition 724 includes a restriction on non-consecutive CCEs 732, the network entity may stagger or space the CCE allocations where two are in CCE [N, N+1] and two are in CCE [N+4, N+5]. Therefore, a gap created in unused CCEs [N+2, N+3] will clue or indicate to UE 702 into the aggregation level of the corresponding PDCCH being two, and not four.

Figure 8:
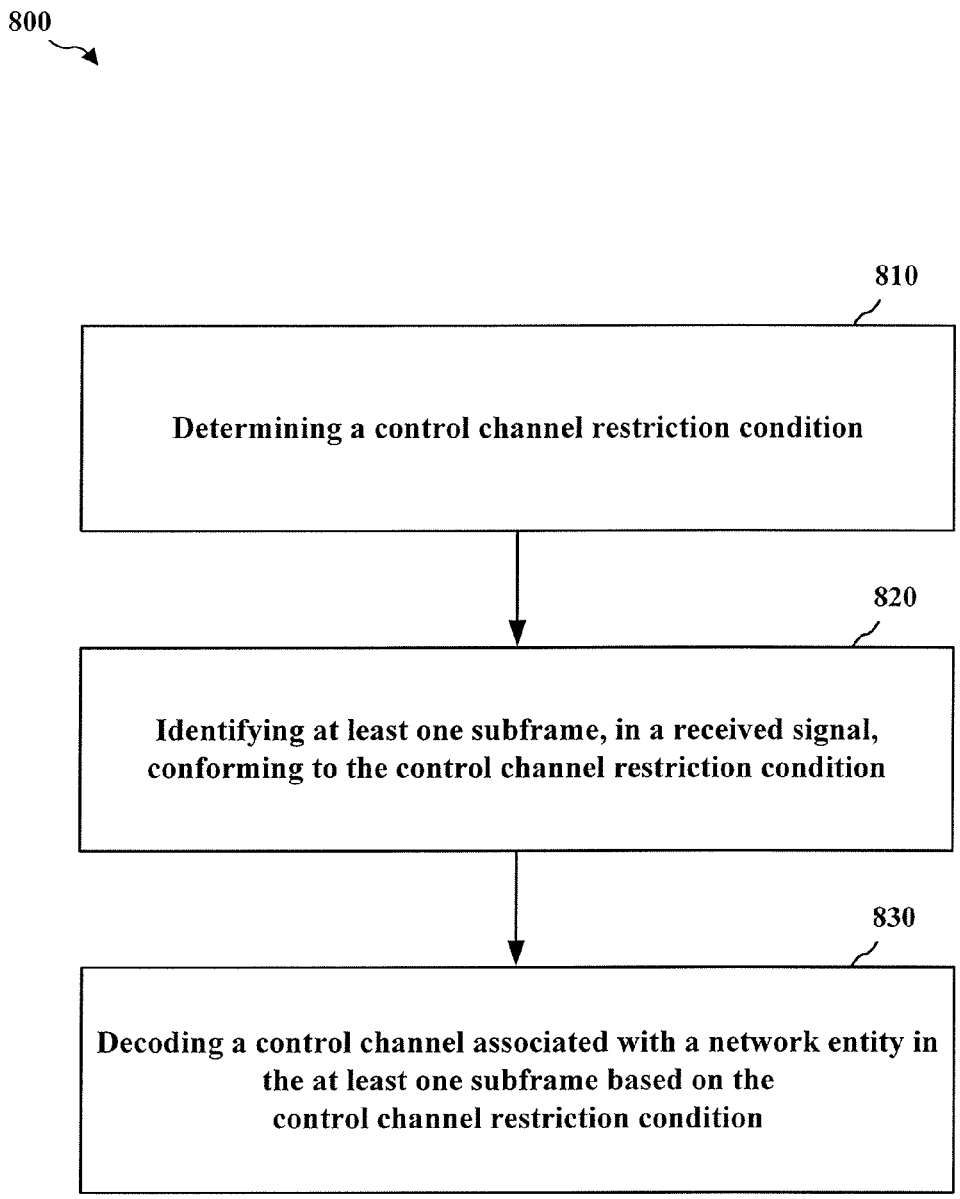
FIG. 8 is a flow chart of a method of decoding a control channel in accordance with an aspect of the present disclosure.
Figure 9:
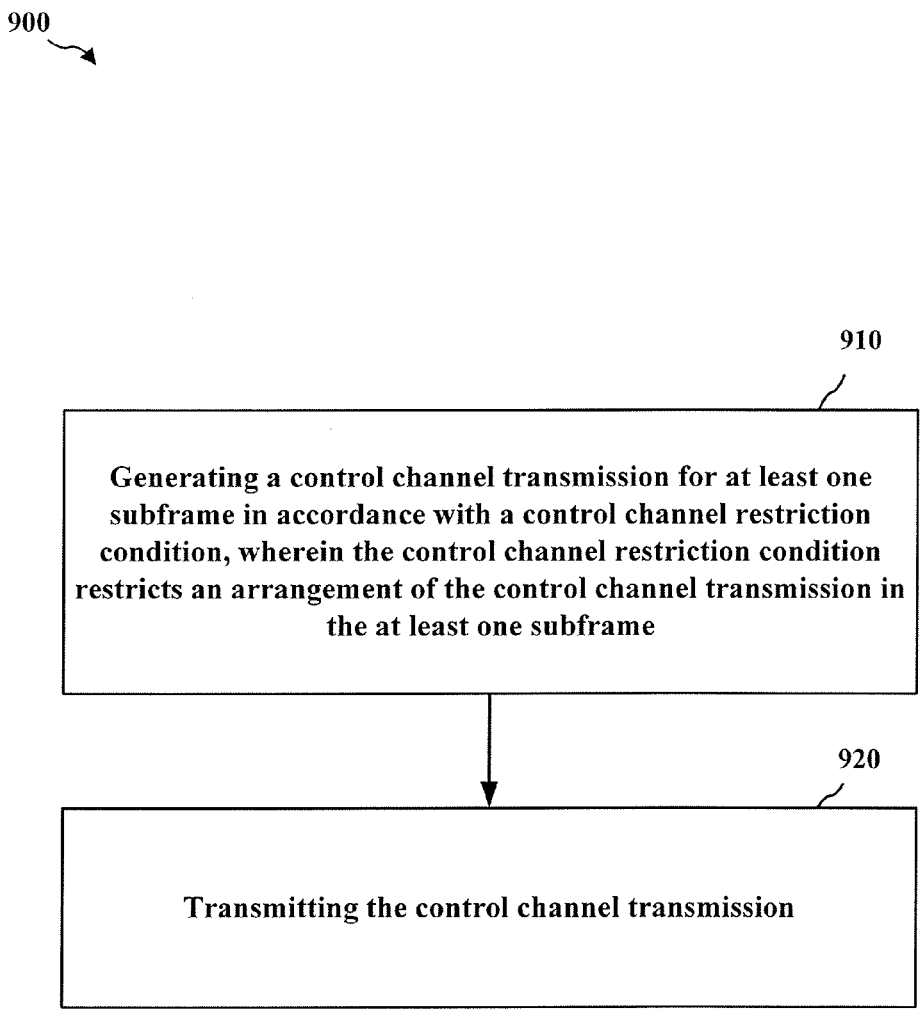
FIG. 9 is a flow chart of a method of restricting a control channel transmission in accordance with an aspect of the present disclosure.

FIGS. 8 and 9 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could be performed as a series of interrelated states or events, and/or substantially in parallel. Further, the various methodologies described in the blocks below may be performed individually or in any combination.

Referring to FIG. 8, in an operational aspect, a UE such as UE 702 may perform one aspect of a method 800 for decoding a control channel in a communication system.

In an aspect, at block 810, method 800 may determine a control channel restriction condition. For example, as described herein, UE 702 may be configured to execute decoding component 720 to determine a control channel restriction condition 724.

Further, at block 820, method 800 may identify at least one subframe, in a received signal, confirming to the control channel restriction condition. For instance, as described herein, UE 702 and/or decoding component 720 may be configured to execute identification component 722 to identify at least one subframe, in a received signal, confirming to the control channel restriction condition.

At block 830, method 800 may decode a control channel associated with a network entity in the at least one subframe based on the control channel restriction condition. For example, as described herein, UE 702 may be configured to execute decoding component 720 to decode a control channel associated with a network entity in the at least one subframe based on the control channel restriction condition. In some aspects, the control channel associated with the network entity conforms to the control channel restriction condition.

Referring to FIG. 9, in an operational aspect, a network entity such as first network entity 704 and/or second network entity 706 may perform one aspect of a method 900 for restricting a control channel transmission.

In an aspect, at block 910, method 900 may generate a control channel transmission for at least one subframe in accordance with the control channel restriction condition. For example, as described herein, first network entity 704 and/or second network entity 706 may be configured to execute control channel restriction component to generate a control channel transmission for at least one subframe in accordance with the control channel restriction condition. In some aspects, the control channel restriction condition restricts an arrangement of the control channel transmission in the at least one subframe.

At block 920, method 900 may transmit the control channel transmission. For example, as described herein, first network entity 704 and/or second network entity 706 may be configured to execute control channel restriction component to transmit the control channel transmission.

Figure 10:
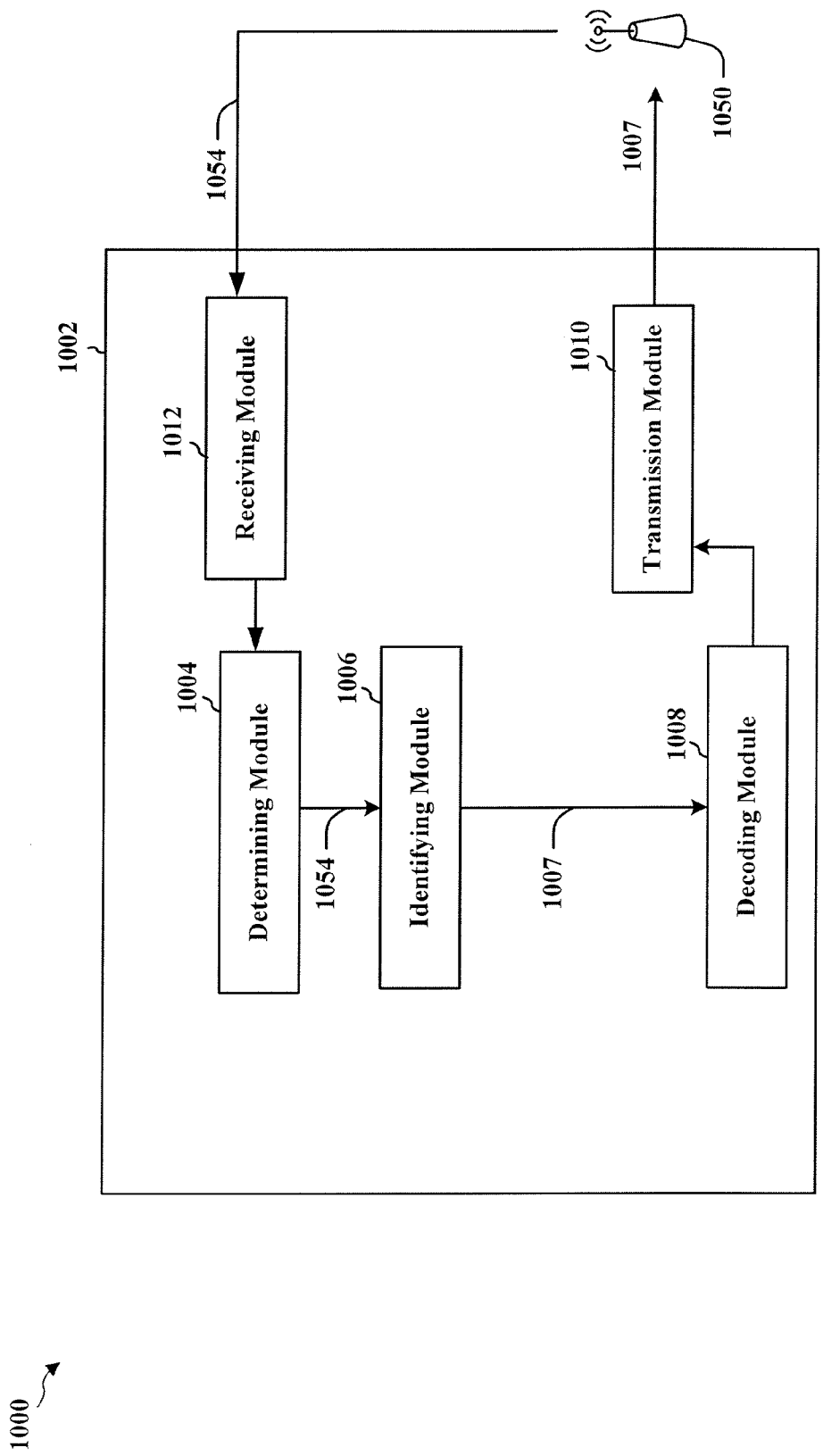
FIG. 10 is a conceptual data flow diagram illustrating the data flow between different modules/means/components in an example apparatus in accordance with an aspect of the present disclosure.

FIG. 10 is a conceptual data flow diagram 1000 illustrating the data flow between different modules/means/components in an example apparatus 1002. The apparatus may be a UE such as UE 702. The apparatus may include a receiving module that receives a control channel restriction condition 724. Further, the apparatus may include determining module 1004 that determines a control channel restriction condition. In an aspect, receiving module 1012 may receive a transmission from network entity 1050 (e.g., via unicast or broadcast signaling), wherein the transmission includes a control channel restriction condition. In such an aspect, the serving network entity 1050 may provide information such as a restriction on a number of PDCCHs, a DCI format, an aggregation level, a search space, and a non-consecutive CCE restriction condition in communication 1054.

Further, the apparatus includes an identifying module 1006 for identifying at least one subframe, in a received signal 1054, conforming to the control channel restriction condition associated with, for example, the transmission from network entity 1050. Additionally, the apparatus 1002 may include a decoding module 1008 for decoding a control channel associated with a network entity in the at least one subframe based on the control channel restriction condition. Any one of the modules of FIG. 10 may be the same as or include similar functionality to the decoding component 720.

Moreover, the apparatus 1002 may include a transmission module 1010 that may communicate information 1007 to at least one network entity (e.g., 1050). In an aspect, the network entity 1050 may be one or more other UEs, an eNB (e.g., first network entity 704 and/or second network entity 706), etc. Any one of the modules of FIG. 10 may be the same as or include similar functionality to the decoding component 720.

Figure 11:
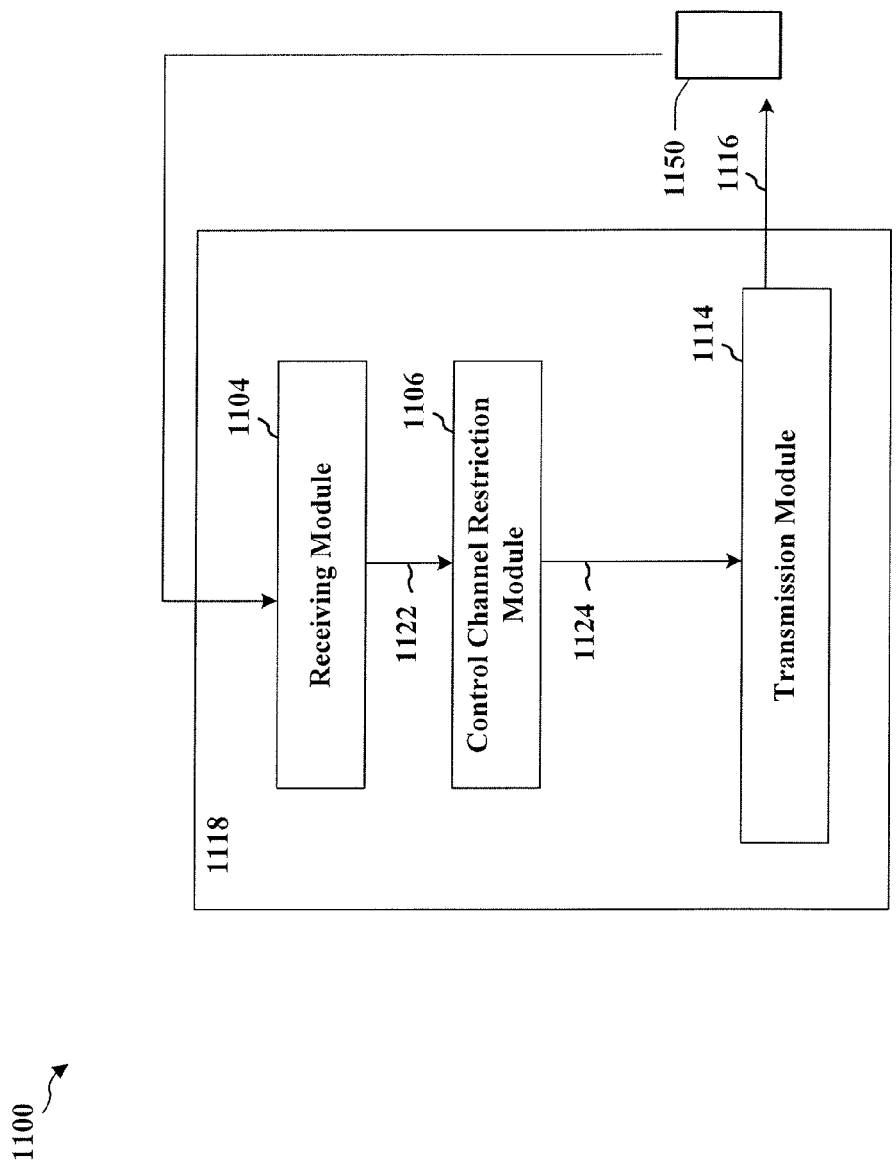
FIG. 11 is a conceptual data flow diagram illustrating the data flow between different modules/means/components in an example apparatus in accordance with another aspect of the present disclosure.

FIG. 11 is a conceptual data flow diagram 1100 illustrating the data flow between different modules/means/components in an example apparatus 1118. The apparatus may be a network entity such as first network entity 704 and/or second network entity 706. The apparatus may include a receiving module 1104 that receives information 1122 from UE 1150. Further, the apparatus may include control channel restriction module 1106 that may apply a control channel restriction condition 1124 to at least one subframe including the control channel transmission. Further, the control channel restriction condition restricts an arrangement of the control channel transmission in the at least one subframe.

Moreover, the apparatus 1118 may include a transmission module 1114 that may transmit or otherwise communicate the control channel restriction condition 1124 and/or the control channel transmission 1116 to at least one UE 1150 (e.g., UE 702). In an aspect, the UE 1050 may be one or more other UEs. Any one of the modules of FIG. 11 may be the same as or include similar functionality to the decoding component 720.

Apparatus 1002 and 1118 may include additional modules that perform each of the blocks of the configurations and/or procedures in the aforementioned flow charts of FIGS. 8 and 9. As such, each block in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
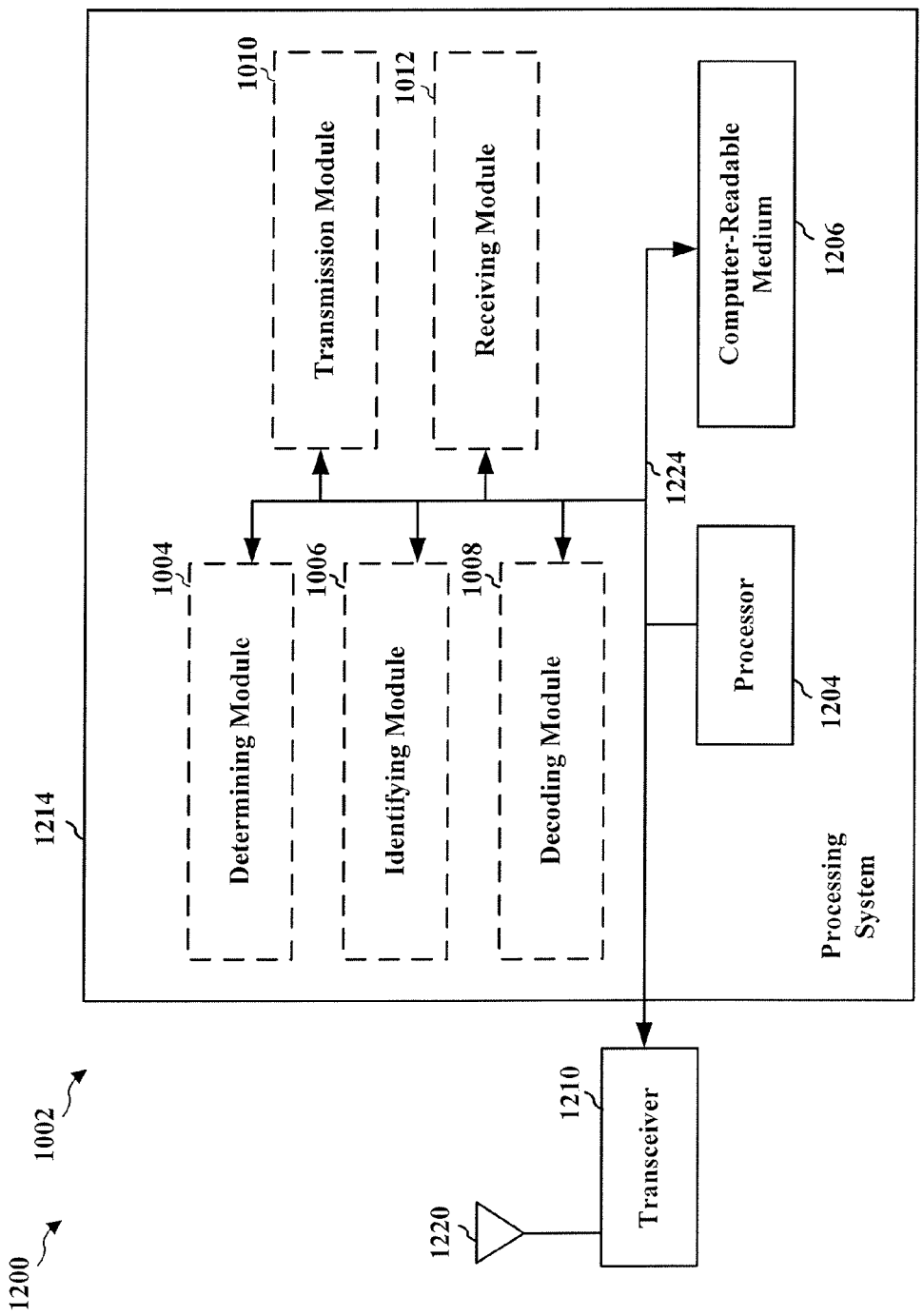
FIG. 12 is a diagram illustrating an example of a hardware implementation for an apparatus employing a processing system in accordance with an aspect of the present disclosure.

FIG. 12 is a diagram 1200 illustrating an example of a hardware implementation for an apparatus 1002 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1004, 1006, 1008, 1010, 1012 and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described herein for any particular apparatus. The computer-readable medium 1206 may also be used for storing data that is manipulated by the processor 1204 when executing software. The processing system further includes at least one of the modules 1004, 1006, 1008, 1010 and 1012.

The modules may be software modules running in the processor 1204, resident/stored in the computer-readable medium 1206, one or more hardware modules coupled to the processor 1204, or some combination thereof. The processing system 1214 may be a component of the UE 702 including decoding component 720, and may be a component of the UE 650 and may include the memory 660 and/or at least one of the TX processor 668, the RX processor 656, and the controller/processor 659.

Figure 13:
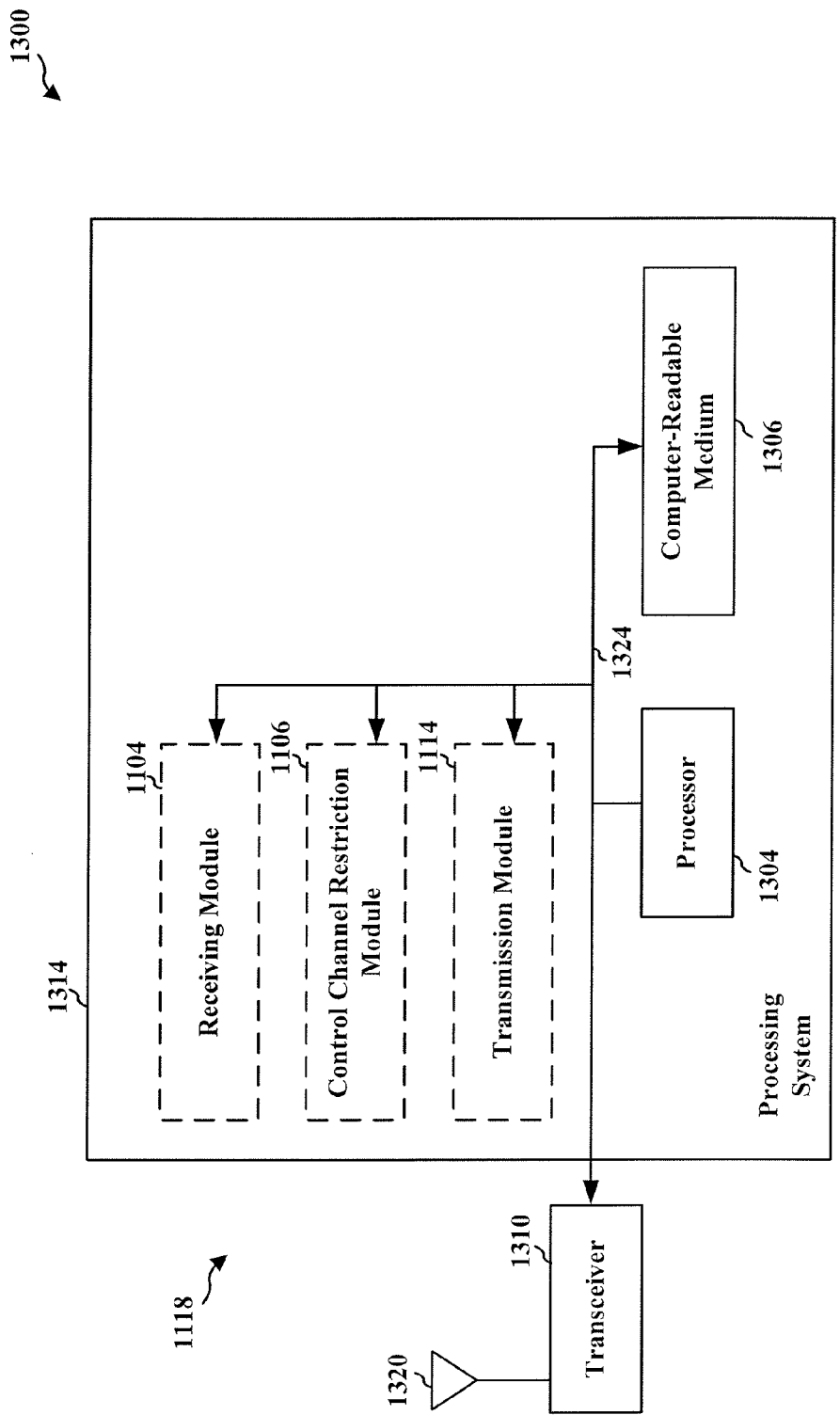
FIG. 13 is a diagram illustrating an example of a hardware implementation for an apparatus employing a processing system in accordance with another aspect of the present disclosure.

FIG. 13 is a diagram 1300 illustrating an example of a hardware implementation for an apparatus 1118 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1104, 1106, 1114 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described herein for any particular apparatus. The computer-readable medium 1306 may also be used for storing data that is manipulated by the processor 1304 when executing software. The processing system further includes at least one of the modules 1104, 1106 and 1114.

The modules may be software modules running in the processor 1304, resident/stored in the computer-readable medium 1306, one or more hardware modules coupled to the processor 1304, or some combination thereof. The processing system 1314 may be a component of the UE 702 including decoding component 720, and may be a component of the UE 650 and may include the memory 660 and/or at least one of the TX processor 668, the RX processor 656, and the controller/processor 659.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of decoding a control channel in a communication system, comprising:
   determining, by a user equipment (UE), a control channel restriction condition associated with the control channel transmitted by an interfering base station, wherein restriction information relating to the control channel restriction condition is broadcast by a serving base station of the UE, the restriction information indicating a control channel restriction type, wherein the control channel restriction condition includes a restriction on a scheduling of the control channel to non-consecutive control channel elements (CCEs) in the at least one subframe, wherein a gap created by unused CCEs within the non-consecutive CCEs is configured to indicate an aggregation level associated with the control channel;
   identifying at least one subframe, in a received signal from the interfering base station and conforming to the control channel restriction condition;
   decoding the at least one subframe to detect a control channel transmitted by the interfering base station, the decoding conforming to at least partly on the control channel restriction type; and
   performing interference suppression on a transmission received from the serving base station at the UE based on the decoded control channel transmitted by the interfering base station.

2. The method of claim 1, wherein the control channel restriction condition further includes a restriction on a number of control channel transmissions in the at least one subframe.

3. The method of claim 1, wherein the control channel restriction condition further includes a restriction on a number of downlink grants of at least one downlink control information (DCI) format.

4. The method of claim 1, wherein the control channel restriction condition further includes a restriction of an aggregation level associated with the control channel.

5. The method of claim 1, wherein the control channel restriction condition further includes a restriction on a search space associated with the control channel, the search space comprising a set of non-overlapping control channel elements (CCEs) determined by the serving and neighboring network entities.

6. The method of claim 1, wherein the decoding includes blind decoding of the control channel associated with the neighboring base station based on the control channel restriction condition.

7. The method of claim 1, wherein the control channel corresponds to a Physical Downlink Control Channel (PDCCH).

8. An apparatus of a user equipment (UE) for decoding a control channel, comprising:
   a decoding component configured to determine a control channel restriction condition associated with the control channel transmitted by an interfering base station, wherein restriction information relating to the control channel restriction condition is broadcast by a serving base station of the UE, the restriction information indicating a control channel restriction type, wherein the control channel restriction condition includes a restriction on a scheduling of the control channel to non-consecutive control channel elements (CCEs) in the at least one subframe, wherein a gap created by unused CCEs within the non-consecutive CCEs is configured to indicate an aggregation level associated with the control channel; and
   an identification component configured to identify at least one subframe, in a received signal from the interfering base station and conforming to the control channel restriction condition, wherein the decoding component is further configured to decode the at least one subframe to detect a control channel transmitted by the interfering base station, the decoding conforming to at least partly on the control channel restriction type.

9. The apparatus of claim 8, wherein the control channel restriction condition further includes a restriction on a number of control channel transmissions in the at least one subframe.

10. The apparatus of claim 8, wherein the control channel restriction condition further includes a restriction on one or both of a number of downlink grants of at least one downlink control information (DCI) format and an aggregation level associated with the control channel.

11. The apparatus of claim 8, wherein the control channel restriction condition further includes a restriction on a search space associated with the control channel, the search space comprising a set of non-overlapping control channel elements (CCEs) determined by the serving and neighboring network entities.

12. A method of restricting a control channel transmission at an interfering base station, comprising:
   generating a control channel transmission for at least one subframe in accordance with a control channel restriction condition, wherein restriction information relating to the control channel restriction condition being broadcast by a serving base station to at least a user equipment (UE), the restriction information indicating a control channel restriction type, wherein generating the control channel transmission further includes restricting a scheduling of the control channel to non-consecutive control channel elements (CCEs) in the at least one subframe, wherein a gap created by unused CCEs within the non-consecutive CCEs is configured to indicate an aggregation level associated with the control channel; and transmitting, by the interfering base station, the control channel transmission to the at least one UE to decode the at least one subframe to detect a control channel associated with the interfering base station, the decoding conforming to at least partly on the control channel restriction type.

13. The method of claim 12, wherein generating the control channel transmission further includes restricting a number of control channel transmissions in the at least one subframe.

14. The method of claim 12, wherein generating the control channel transmission further includes restricting a number of downlink grants of at least one downlink control information (DCI) format in the control channel transmission.

15. The method of claim 12, wherein generating the control channel transmission further includes restricting an aggregation level associated with the control channel transmission.

16. The method of claim 12, wherein generating the control channel transmission further includes restricting a search space associated with the control channel transmission.

17. The method of claim 16, wherein restricting the search space includes restricting the search space for each radio network temporary identifier (RNTI) associated with the neighboring base station based on an aggregation level.

18. The method of claim 16, wherein restricting the search space includes coordinating with at least one neighboring base station to restrict the search space to a set of non-overlapping control channel element (CCE) locations.

19. The method of claim 12, wherein the control channel restriction condition restricts the decoding of the control channel transmission in the at least one subframe by one or more user equipments.

20. The method of claim 12, wherein the control channel transmission corresponds to a Physical Downlink Control Channel (PDCCH) transmission.

21. An apparatus for restricting a control channel transmission, comprising:

a control channel restriction component configured to:

generate a control channel transmission for at least one subframe in accordance with a control channel restriction condition, wherein restriction information relating to the control channel restriction condition being broadcast by a serving base station to at least a user equipment (UE), the restriction information indicating a control channel restriction type, wherein the control channel restriction condition includes a restriction on a scheduling of the control channel to non-consecutive control channel elements (CCEs) in the at least one subframe, wherein a gap created by unused CCEs within the non-consecutive CCEs is configured to indicate an aggregation level associated with the control channel; and transmit, by an interfering base station, the control channel transmission to the at least one UE to decode the at least one subframe to detect a control channel associated with an interfering base station, the decoding conforming to at least partly on the control channel restriction type.

22. The apparatus of claim 21, wherein to generate the control channel transmission, the control channel restriction component is further configured to restrict a number of control channel transmissions in the at least one subframe.

23. The apparatus of claim 21, wherein to generate the control channel transmission, the control channel restriction component is further configured to restrict one or both of a number of downlink grants of at least one downlink control information (DCI) format in the control channel transmission and an aggregation level associated with the control channel transmission.

24. The apparatus of claim 21, wherein to generate the control channel transmission, the control channel restriction component is further configured to restrict a search space associated with the control channel transmission by at least coordinating with at least one neighboring base station to restrict the search space to a set of non-overlapping control channel element (CCE) locations.

* * * * *